Oct. 3, 1939.  B. A. HOWE  2,175,119
DOUGH TWISTING MACHINE
Filed Jan. 9, 1939  5 Sheets-Sheet 1
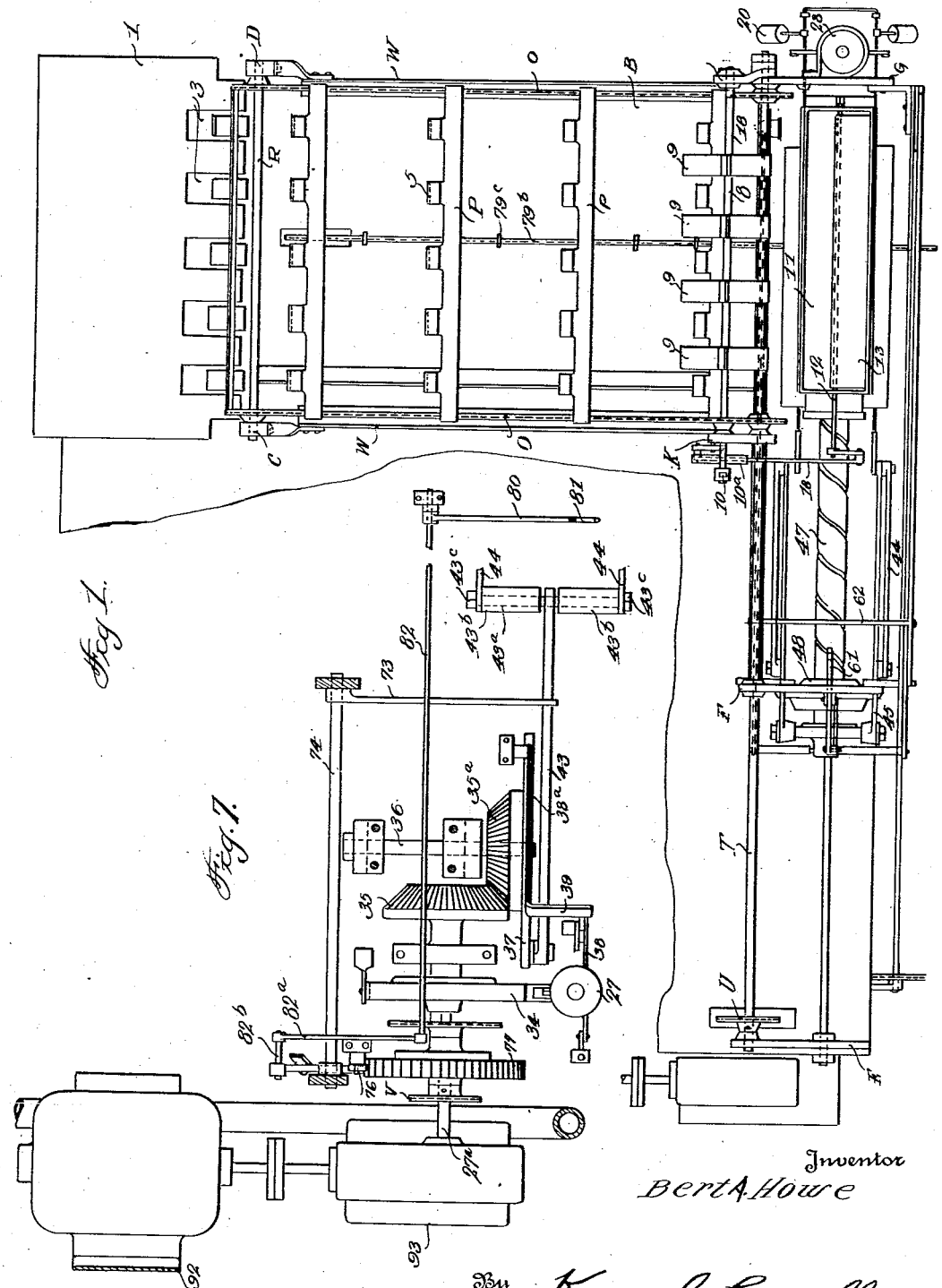
Inventor
Bert A. Howe
By Kimmel & Crowell
Attorneys

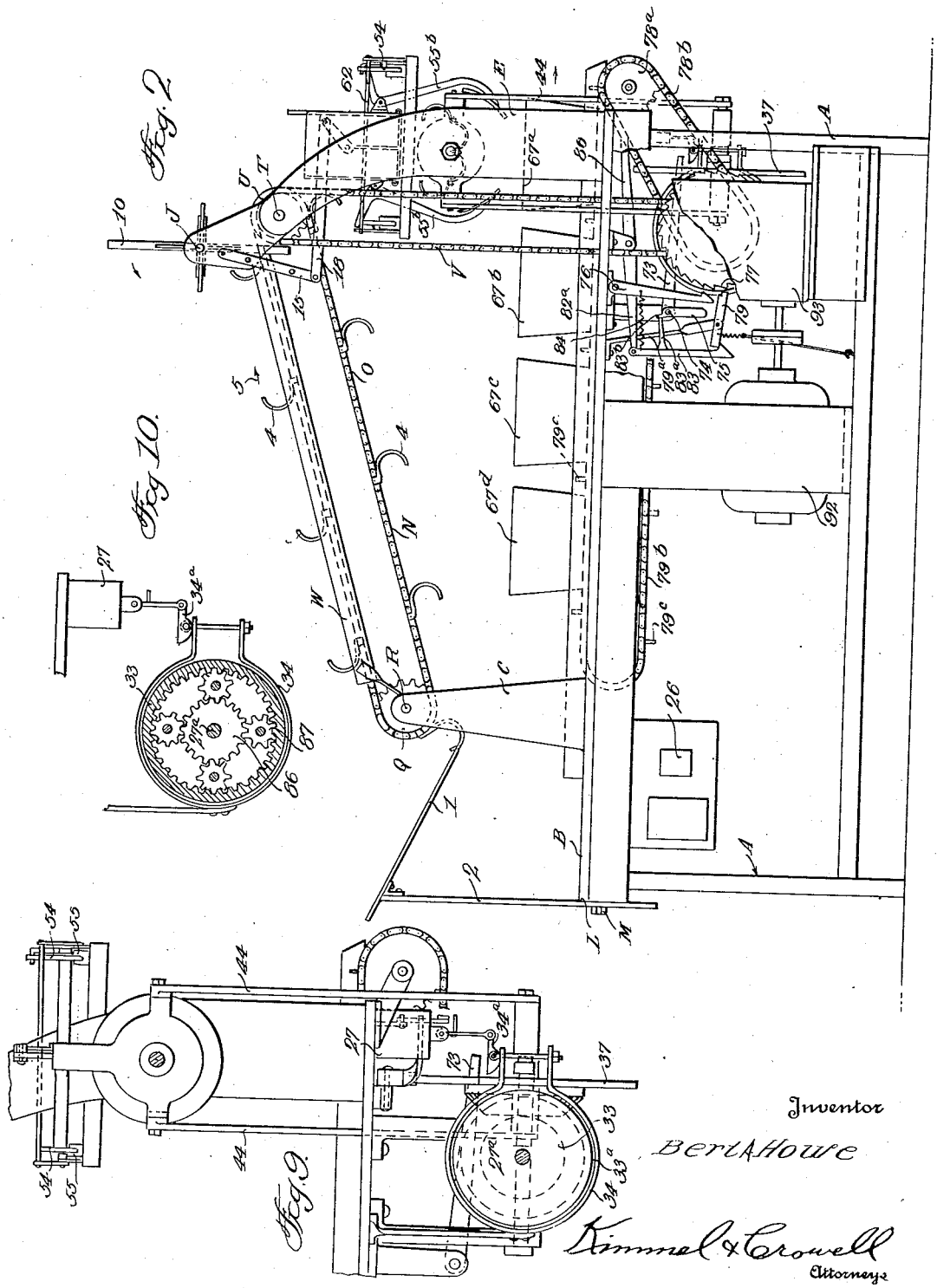

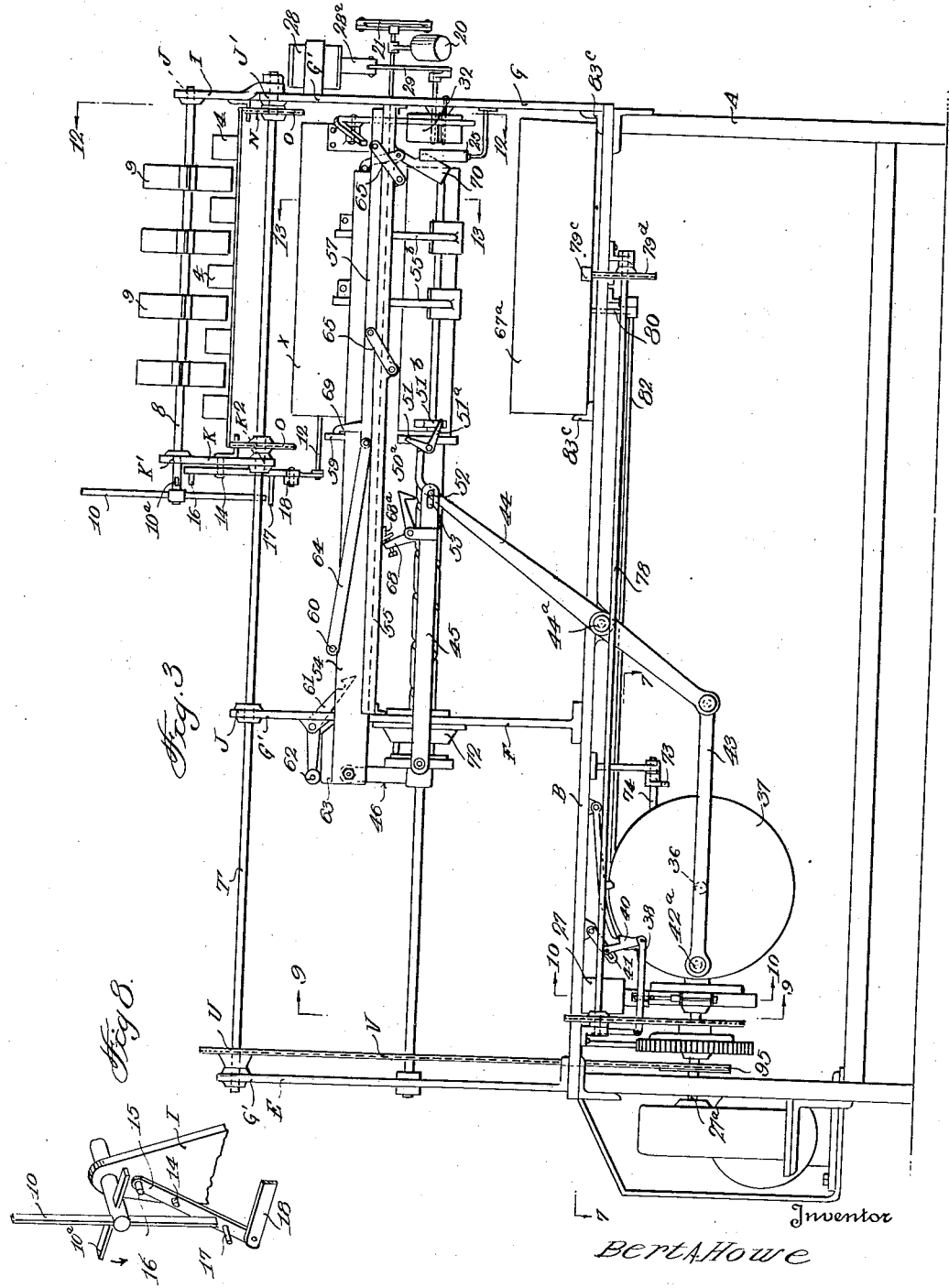

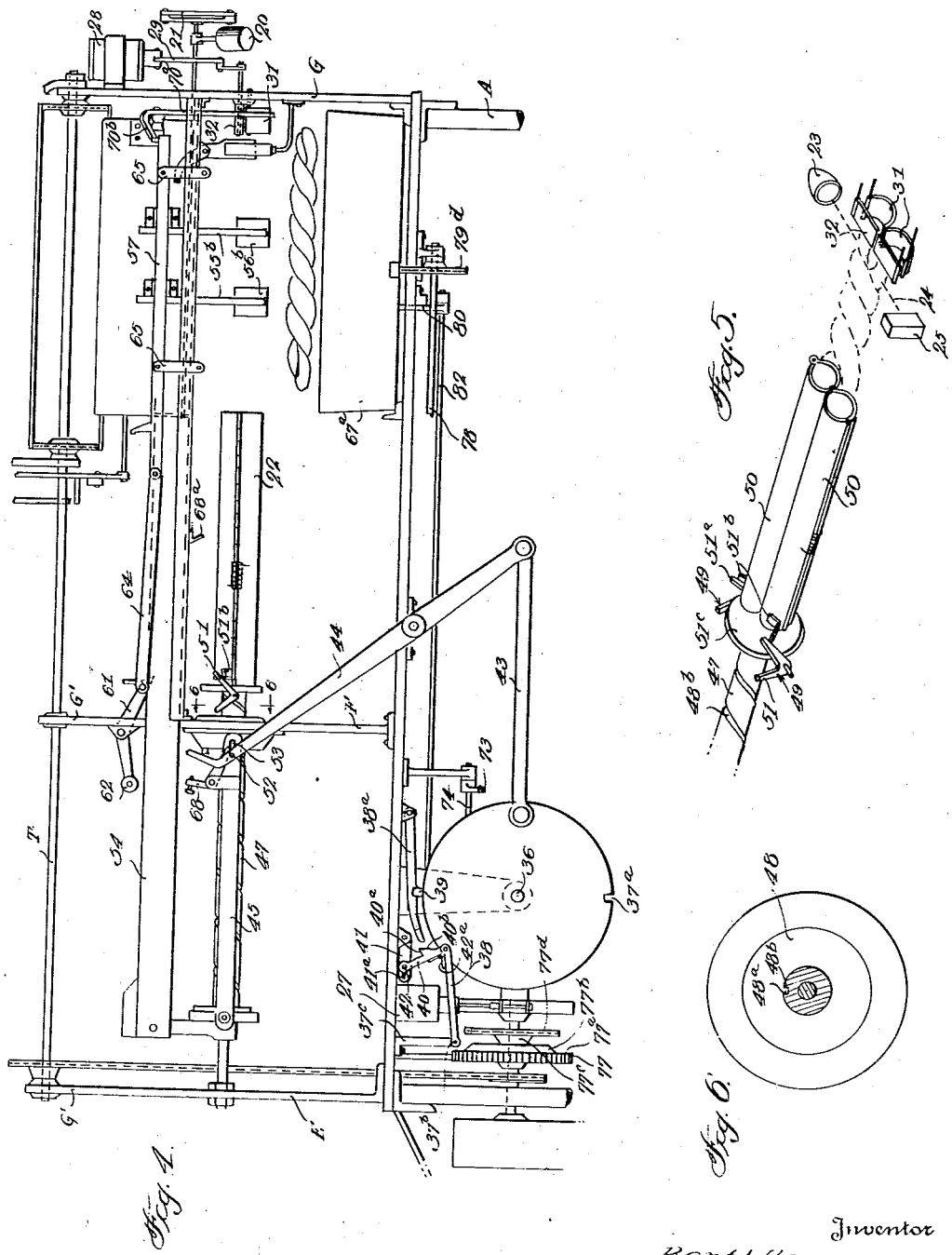

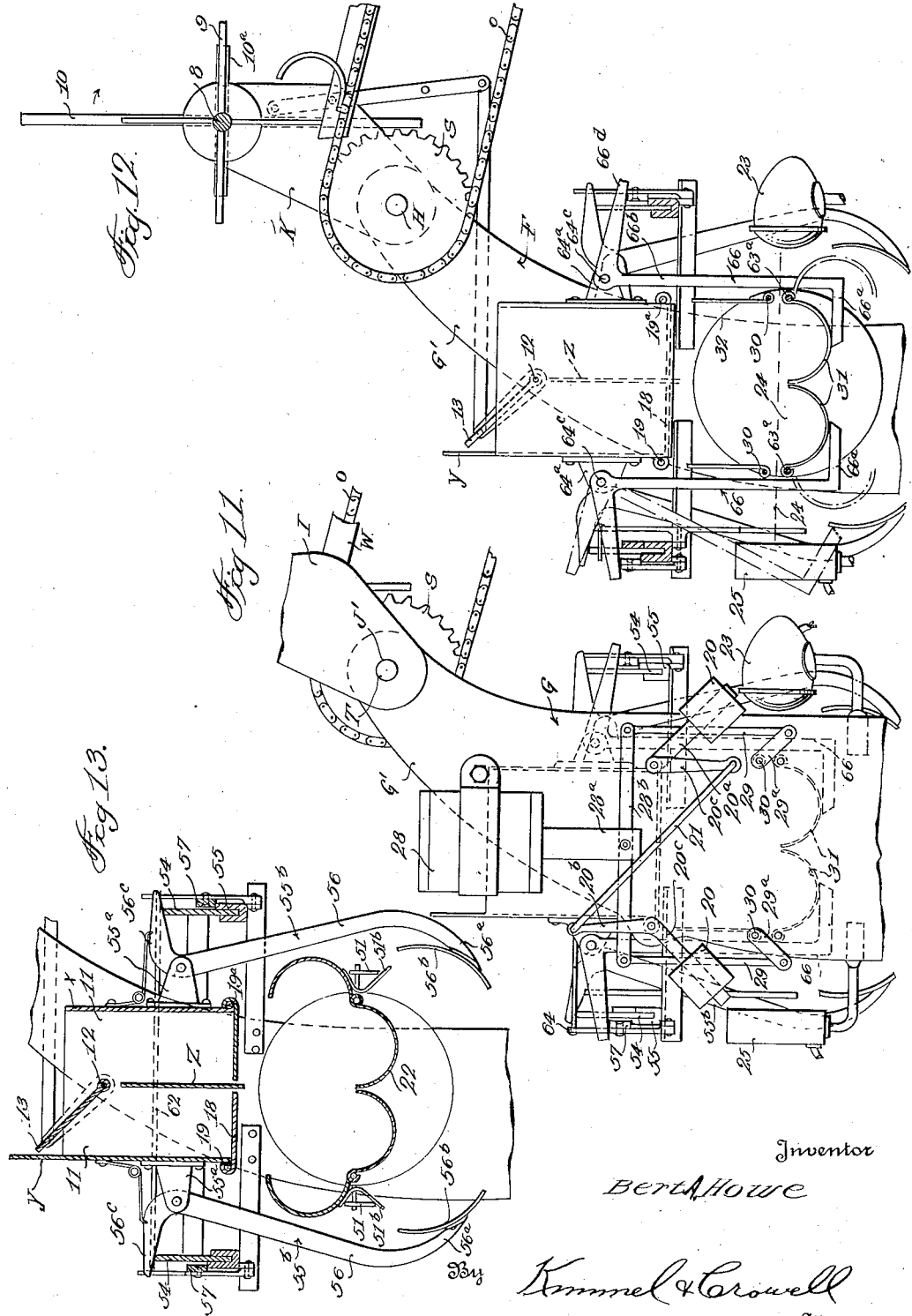

Patented Oct. 3, 1939

2,175,119

UNITED STATES PATENT OFFICE 2,175,119

DOUGH TWISTING MACHINE

Bert Austin Howe, Tucson, Ariz.

Application January 9, 1939, Serial No. 250,055

14 Claims. (Cl. 107—8)

This invention relates to a dough twisting machine.

The invention aims to provide, in a manner as hereinafter set forth, a machine of the class referred to for twisting together a pair of batches of dough.

The invention further aims to provide a machine for the purpose set forth with means for supplying two batches of dough to a twisting mechanism to act on the batches in a manner to twist them together, supporting the batches during the twisting operation and then automatically releasing the twisted batches of dough at the completion of the twisting action thereon.

The invention further aims to provide a machine for the purpose set forth with means for simultaneously supplying a pair of batches of dough to a twisting mechanism, clamping the batches during the twisting operation and automatically releasing the twisted batches of dough after they have been twisted together.

The invention further aims to provide a machine for the purpose set forth including a normally inactive light beam control twisting means for batches of dough and means for supplying the dough to said twisting means and with the dough on its passage to said twisting means breaking a light beam whereby the twisting means is thrown into operation for the purpose of twisting the batches of dough together.

The invention further aims to provide a machine for the purpose referred to including a means for twisting batches of dough together and controllable means for shifting said twisting means to loading position and from loading position to provide a twisting action on the dough and at the end of the twisting action discharging the twisted together dough and after discharge of the twisted dough returning the twisting means to loading position.

The invention further aims to provide a machine for the purpose referred to with automatically operable supporting means for the dough on the twisting of the latter, and with said means movable in the direction to provide for the dropping of the dough at the end of the twisting operation thereon.

The invention further aims to provide a dough twisting machine which is comparatively simple in its construction and arrangement, automatic in its action, strong, durable, compact, thoroughly efficient in its use, readily assembled, quickly repaired when occasion requires, and comparatively inexpensive to set up.

Embodying the aims aforesaid and to others which directly or indirectly will hereinafter appear, the invention consists of the novel construction, combination and arrangement of parts as will be more specifically referred to and illustrated in the accompanying drawings, wherein is shown an embodiment of the invention, but it is to be understood that changes, variations and modifications may be resorted to which fall within the scope of the claims hereunto appended.

In the drawings:

Figure 1 is a general plan view of the machine,

Figure 2 is a side elevation thereof,

Figure 3 is a front elevation thereof showing the parts in one position,

Figure 4 is a fragmentary front elevation with certain of the parts in position assumed when the dough has been twisted, Figure 5 is a perspective view of the twister removed from the remainder of the apparatus, Figure 6 is an enlarged detail section on line 6—6, Figure 4, Figure 7 is a section on line 7—7, Figure 3, Figure 8 is a perspective view of one of the trip mechanisms forming a part of the machine, Figure 9 is a section on line 9—9, Figure 3, Figure 10 is a section on line 10—10, Figure 3, Figure 11 is a fragmentary side elevation showing certain parts of the machine on an enlarged scale, Figure 12 is an enlarged detail section on line 12—12, Figure 3, and Figure 13 is an enlarged detail section on line 13—13, Figure 3.

The machine includes a supporting structure A having as parts thereof a platform or table B, spaced parallel uprights C, D of like height secured on platform B, spaced aligned uprights E, F, G secured on platform B and having incurved upper terminal portions G1 formed with aligning openings H. The uprights C, D are of less height than the said other uprights. Arranged at the upper end of upright G is an upstanding extension I provided with upper and lower openings J, J1 respectively. The opening J1 registers with the opening H in upright G. Arranged in parallel spaced relation with respect to the extension I is an upstanding suspended plate K of the same form as extension I and provided with upper and lower openings K1, K2 respectively aligning with the openings J, J1. The manner in which plate K is suspended will be hereinafter referred to.

The machine includes a receiving tray capable of storing batches of dough which are to be twisted and for feeding same when required. The tray is in the form of a sheet metal plate 1 arranged over platform B and extending downwardly at an inclination from its outer end to uprights C whereby the batches of dough will move downwardly by gravity. The plate 1 is arranged outwardly of the upright C, D and is to have its lower end suitably connected to such uprights below the upper ends of the latter. The upper or outer end of the plate 1 is mounted upon a vertical adjustable support 2 which is suitably connected at its lower end terminal portion against the end L of platform B as at M. The lower end of plate 1 is formed with spaced cutouts, as at 3 (Figure 1) and which open at the inner or lower end of the plate.

The machine includes an endless conveyor N for picking up the batches of doughs successively from off of the receiving tray and conducting them to a hopper to be referred to. The conveyor N consists of a pair of spaced parallel sprocket chains O connected together at spaced intervals by transverse slats P, each formed with an outwardly directed row of spaced cup-shaped dough pick-up fingers 4 of concavo-convex cross section. The chains O travel around sprockets Q carried by a shaft R journaled in the openings H of the uprights E, F, G, the openings J1, K2 in the extension I and plate K. The shaft T supports plate K and carries a drive sprocket U therefor which is driven by an endless sprocket transmission V. The conveyor N travels in the direction of the arrow 5 (Figure 2). The rows of pickup fingers successively travel upwardly through the cutouts 3 in the plate 1 and each row picks up a dough from off the plate and conducts it to the hopper. The conveyor N includes upstanding side cheeks W which are connected with the uprights C, D and with the uprights E.

The extension I and plate K project above the conveyor N adjacent the upper end of the latter, and which have journaled in the openings J, K2 thereof a rotatable shaft 8 formed with sets of radially disposed paddles 9. As the batches of dough advance they successively align paddles of the sets of paddles 9 and rotate shaft 8. In the event that a row of fingers 5 does not contain a dough the paddles are not shifted. The shaft 8 at one end carries a set of radially disposed fingers, arranged in pairs, the fingers of one pair are indicated at 10 and they endwise align, and the fingers of the other pair are indicated at 10a and they endwise align. The fingers 10 are of greater length than the length of fingers 10a. The fingers 10 will be termed long fingers and the fingers 10a short fingers. The purpose of the paddles 9 is to rotate shaft 8. The purpose for which the fingers are used will be hereinafter referred to.

The hopper is indicated at X and is open at its top and bottom. Preferably it is of uniform width and breadth. The hopper X is arranged below and adjacent to the discharge end of the conveyor N. That side wall Y of the hopper which is located remote from the discharge end of the conveyor extends above the other walls of the hopper and its extended portion forms a combined abutment and director for a dough discharged from the conveyor. The rows of fingers 5 successively discharge the dough in a downward direction into the open upper end of the hopper. The latter includes a vertically disposed centrally arranged partition Z which divides the hopper into a pair of chambers or compartments 11. The partition Z depends from the bottom of and has its upper end positioned below the top of the hopper. Journaled in the hopper X and arranged over the upper end of the partition Z is an oscillatory shaft 12, which carries a vane 13 employed to alternately close the upper ends of the chambers 11 whereby the chambers alternately receive a batch of dough.

Pivotally mounted, intermediate its ends, as at 14 (Figure 8) on the extension I of the upright G is an upstanding lever 15. The latter on its outer side surface is provided with laterally extending spaced pins 16, 17. The pin 16 is arranged above the pin 17, disposed at the upper end of lever 15 and positioned in the path of the short fingers. The pin 17 is disposed on the lever 15 between pivot 14 and the lower end of the lever and is arranged in the path of the long fingers. Pivotally connected to the lower end of lever 15 is a shifter bar 18 for and which is connected to the upper end of the vane 13. The latter extends above the walls of housing X, other than the wall Y of the latter.

As the shaft 8 rotates, it revolves the fingers 10, 10a, whereby a short finger comes in contact with the pin 16 and causes the advance of the top of the lever 15, at which time the long fingers are disposed in a horizontal position, and when another impulse is given to shaft 8 by a dough abutting the paddles, a long finger engages with the pin 17 and returns the lever 15 to the position shown in Figure 8. The short and long fingers alternately act to oscillate lever 15 which in turn imparts a reciprocating movement to shifter bar 18 which provides for the oscillating of vane 13, resulting in the alternately opening and closing of the chambers 11 in the hopper X whereby the dough will be alternately supplied to said chambers.

There is associated with the hopper X a pair of oppositely disposed dumping gates 18 for simultaneously opening and closing the bottoms of the chambers 11. The gates 18 are carried by rotatable shafts 19, 19a to which a weighting structure is attached functioning to releasably hold the gates normally in closed or horizontal position and to simultaneously open the gates on the overbalancing of said structure. The weighting structure (Figure 11) consists of a pair of weights 20 adjustably mounted on depending outwardly inclined carriers 20a, an upstanding crank arm 20b, a depending crank arm 20c and a tie rod 21 between the crank arms. The weighting means is so adjusted so that one dough, when deposited in one chamber 11, will remain in such chamber until another dough is deposited in the other chamber. The combined weight of the two doughs in the chambers will be sufficient to overbalance the weighting structure and raise the weights 20, whereby the gates will be swung open for the discharge of the two batches of dough which have been deposited in the chambers 11. After the doughs have been discharged from the said chambers, the weights 20 lower by gravity and rotate shafts 19, 19a in a direction to provide for the closing of the gates.

Adapted to be positioned below the chambers 11 of the hopper X is a pair of bodily shiftable parallel semi-tubular dough receiving trays 22 and positioned relatively to said trays when the latter are below the hopper, is an electric lamp 23 for directing across the top of the trays a light beam 24, indicated by dotted lines Figure 12 to a photo-electric cell 25 which correlates with a magnetic switch 26 (Figures 2 and 11) employed to energize the solenoids 27, 28 (Figure 3). Suitably attached to the core 28a of the solenoid 28 is a horizontally disposed cross bar 28b to the ends of which are suitably attached, the upper ends of a pair of depending arms 29 carrying oppositely disposed pivoted links 29a, which are attached to a pair of shafts 30, arranged above short semi-tubular pans 31 which are endwise aligned with the trays 22. Carried by the shafts 30 are clampers 32. The solenoid 28, when energized, shifts the arms 29 in a direction to provide for the links 29a to shift the shafts 30 in a direction to move the clampers 32 to clamping position. In this connection, it will be stated that the doughs when discharged from the hopper X are received into the trays 22 and pans 31 and the ends of the batches of dough are clamped stationary to the pans 31 by the clampers 32.

Arranged below the solenoid 27 is a driven shaft 27a which carries a planetary clutch 33 having associated with the outer periphery of its outer shell, casing or band 33a a brake band 34 in the form of a split annulus, which is connected, at its ends to an applicator device 34a therefor. The device 34a is operated to brake band applying position by the core of solenoid 27. Permanently intermeshing mitre gears 35, 35a disposed in angular relation are carried respectively by the clutch 34 and a rotatable shaft 36 disposed adjacent to and at right angles to the inner end of shaft 27a. Attached to the shaft 36 and bodily carried therewith is a normally latched crank disc 37. The latter has a notch 37a in its edge. Pivotally connected at one end, as at 37b to the lower end of a hanger 37c is a lever arm 38 which is raised by the device 34a, when solenoid 27 is energized. A gravity lowering pivoted latching member is indicated at 38a and is provided with a pin 39 for engagement in the notch 37a to arrest rotation in either direction of the disc 37 until the pin 39 clears notch 37a. Suitably connected to the other end of the arm 38 is an upstanding movable lifter element 40 formed with a shoulder 40a on its inner side for correlation with the non-pivoted end of member 38a to lift the latter to have pin 39 clear notch 37a. The inner side edge of lifter 40 below shoulder 40a is bevelled as at 40b. Arranged over the lifter 40 is a pivoted lever 41 provided with a slot 41a into which is slidably mounted a pin 42 carried by the upper end of the lifter 40. The pin 42 coacts with the lever 41 for maintaining the lifter 40 in an upstanding position. The elements as set forth in this paragraph are arranged below and supported from the table B.

The disc 37 is released by the device 34a and elevated, when solenoid 27 is energized and which in turn will elevate arm 38 therewith. As arm 38 moves upwardly lifter 40 will also move upwardly and outwardly and act in a manner on member 38a to move pin 39 clear of disc 37. Lifter 40 moves clear of member 38a on its upward travel (Figure 4) and when member 38a is moved upwardly to release disc 37, it falls after lifter 40 clears it to cause pin 39 to ride on the edge of disc 37 until it enters notch 37a. The outward shift of lifter 40 is arrested by a stop 42a and the inner end wall of slot 41a.

Eccentrically and pivotally connected to the disc 37, as at 42a is one end of a connecting rod 43 which has pivotally mounted in its outer end a rod 43a upon the ends of which are pivotally mounted the lower ends of a pair of upstanding oscillatory push or lever arms 44 which are pivotally connected intermediate its ends, as at 44a to the table B. The arms 44 adjacent their upper ends are attached to connecting rods 45 forming elements of and constituting reciprocators for a slidably mounted cross head assembly 46 arranged above the platform B. Spacers 43b are provided on rod 43a for arm 44. The rod 43a carries retaining means 43c for arms 44. The assembly 46 has revolubly connected thereto a helically grooved dough twister shaft 47 mounted in a stationary collar, one end of a helical nut or bearing 48 formed with a stud 48a travelling in the groove 48b of shaft 47 to provide for the revolving of the latter on the travel of the assembly 46. Secured to and bodily carried with the shaft 47 is a pair of spaced normally inactive bell cranks 49, which when active function to open the spring controlled covers 50 for and which are pivotally connected to the trays 22. The arms 44 extend above the rods 45, as at 50a and such extended portions are of angular form and are so shaped, that when the arms 44 have the parts thereof, above their pivot 44a extend toward the trays 22, the said portions 50a thereof will bear on the arms 51 of bell cranks 49 and shift the latter in a direction whereby the arms 51a, of the bell cranks 49 will engage abutments 51b on the covers 50, and move the latter to open position against the action of their controlling spring, to permit of the batches of dough being supplied to the trays 22. Fixed to and of greater diameter than the inner end of shaft 47, is a disc 51c to which is fixidly secured the inner ends of the trays 22. The covers 50 move to opening and closing relation with respect to the trays 22 clear of the disc 51. The trays and covers bodily move with shaft 47. Upon the start of motion of the arms 44, in a direction whereby the upper ends of the arms will move away from the trays 22, the arms 44 pull away from bell cranks 49, whereby the covers 50 are released to close over the trays 22 and cause the batches of dough to be encased in their respective trays 22. The arms 44, in proximity to their extended portion 50a are provided with pins 52 which travel in slots 53 provided in the inner end of the rods 45. This provides pin and slot connections between arms 44 and rods 45. As the arms 44 move away from bell cranks 49, the pins 52 slide in the slots 53 while the covers 50 are closing. When pins 52 reach the outer ends of the slots 53, the arms 44 function in connection with the rods 45 to move the assembly 46 outwardly carrying shaft 47 therewith, whereby the stud 48a on collar 48, will provide for the revolving of shaft 47 resulting in applying a twisting action on the batches of dough supplied to trays 22. The batches of dough supplied to the trays 22 are also supplied to pans 31 and have that terminal portion thereof arranged in the pans 31 clamped therein, whereby as the trays 22 revolve with the shaft 47, the batches of dough are twisted together. The trays 22 move off of the dough at the completion of the twisting action. The twisting action continues until the disc 37 has rotated 180°.

Arranged at the top of and moving with the assembly 46 are spaced parallel bars 54 which travel in and extend above stationary channel members 55. Pivotally supported from spaced lugs 55a on opposite sides of the hopper X are two spaced pair of oppositely disposed spring controlled twisted dough holders 55b. Each holder is of like form and each consists of an angular shaped arm 56 having an inturned lower portion 56a formed with a grip 56b of arcuate form. The holders 55b depend to a point below the trays 22. The lugs 55a are spaced from opposite sides of the hopper X. The outer sides of the members 55 are of greater height than their inner sides and mounted on the aforesaid inner sides are upwardly shiftable bars 57 having their upper surfaces arranged below the upper surfaces of the bars 54. The upper ends 56c of the arms 56 are outwardly directed and are to seat upon the upper surfaces of the bars 54 prior to the twisting operation whereby the holders 55b will be releasably held in the position shown in Figure 12, that is inactive. When the bars 54 move back or rather outwardly with the assembly 46, and while the dough is being twisted, the upper ends 56c of the arms 56 drop to the bars 57 whereby the lower portions of the arms 56 will be moved in a direction to cause the grips 56b to hold the twisted dough until the assembly 46 has reached the end of its outward movement.

The bars 54 are formed intermediate their ends with upstanding bosses or lugs 59. Disposed in the path of the lugs 59 is a cross rod 60 adapted to engage in a spring controlled pivoted latch 61 having a bar or pin 62 engaged by a cam 63 on and bodily movable with assembly 46. The bar 62 is engaged by cam 63 to hold latch 61 in the position shown in Figure 3 just prior to the start of the twisting action. When assembly 46 moves outward, cam 63 moves clear of bar 62 and the latch 61 moves to a horizontal position and into the path of rod 60. As the assembly 46 approaches the end of its outward stroke the bosses 59 push the rod 60 into the latch 61. The latch 61 is carried by upright F. Attached to the rod 60 is a pair of connecting bars 64 which are also attached to the bars 57. As the rod 60 is forced outward, it pulls the rods 64 and bars 57 therewith. At the end of the outward stroke of the assembly 46, the rod 60 will be made fast in the latch 61.

The pans 31 are pivotally mounted at the upper ends of their outer sides upon stationary shafts 63a, and are normally held in the position shown in Figure 12 to receive the batches of dough by a pair of oppositely extending spring controlled holders 66 of like form and of angular contour. The holders 66 are suspended from lugs 64a on the hopper X adjacent the lugs 55a. Each holder 66 consists of an inwardly extending lower part 66a, an upstanding intermediate part 66b pivoted at its upper end, as at 66c to a lug 64a and an outwardly directed downwardly inclined upper part 66d. The normal position of the holders 66 are shown in full lines Figure 12 and which sustains the pans 31 in a horizontal or receiving position. The normal position of holders 55a is as shown in dotted lines Figure 12. The normal position of the holders 66 is the active position thereof. The normal position of the holders 55b is the inactive position thereof. The holders 66 are shifted to inactive position, against the action of their springs by the bars 57 over which extend the parts 66d of such holders. The holders 55b are moved to active position by their springs when the upper ends 56c thereof are cleared from the bars 54 and drop towards the bars 57. The holders 55b are moved to inactive position by the bars 57 and releasably held in such position by the bars 54.

Each bar 57 is connected to a member 55 by a pair of spaced upstanding links 65, having their ends pivotally attached to said members 55 and bars 57. Latches 68 are pivotally supported from and bodily movable with the rods 45. Latches 68 are controlled by abutments 68a on members 50. The latches 68 are to hold the pins 52 at the advance ends of the slots 53. The bars 57 carry upstanding lugs 69, arranged to be engaged by the bosses or lugs 59 on the return movement of the bars 54. For intersecting the light beam is a flag or interrupter 70, and which is carried by a hanger 70a pivotally suspended eccentrically thereof from the hopper X. The hanger 70a is formed with an angularly disposed upper end 70b. The flag 70 normally is in non-intercepting relation with respect to the light beam and is retained in such position by one of the bars 54, which at the end of its reverse stroke engages under the hanger end 70b and shifts the hanger 70a in a direction to move the flag 70 clear of the light beam. On the start of such bar 54, on its outward movement, it releases hanger end 70b, then flag 70 automatically moves to a position to intercept the light beam. A stop 72 is formed on the outer side of collar 48.

After the grips 56b have been moved to the position for holding the twisted dough, and during the outward movement of the bars 54 the bosses 59 engage with and push the rod 60 into the latch 61, the later having assumed a horizontal position caused by the bar 62 riding off of the cam 63. As the rod 60 is pushed towards the latch 61, it pulls the rods 64 and the bars 57 in a like direction whereby the links 65 will move towards the vertical and elevate the bars 57 which in turn will force upwardly the ends 56c of holders 55a and the parts 66d of the holders 66, and shiftholders 55a, 66 to a position to release the twisted dough for dropping into a pan 67a to be referred to. As the parts 66d of the holders 66 move upwardly, due to the elevating of the bars 57, the parts 66a of the holders 66 move away from each other and permit of the pans 31 dumping or lowering thereby releasing the clamped ends of the dough.

When the disc 57 has been rotated 180°, the arm 43 moves in the opposite direction and causes the cross head assembly and twisting means to move back to loading position. The links 56 are held upward by the bars 67. The pins 52 are held at the advance end of the slots 53 by the latches 68. As the bars 54 approach the end of their reverse stroke, the cam 63 forces the pin or rod 62 upward, releasing the bar 60 from the latch 61, and the bosses 59 riding against the bosses or lugs 69 force the bars 57 to their normal position, permitting the upper ends of the holders 55a to rest against the bars 54 and acting on the upper ends of the holders 66 to shift the latter so as to restore the pans 31 to dough receiving position. As one of the bars 54 reach the end of its return stroke it engages and shifts the suspension for the flag 70 in a direction to move the latter out of the path of the light beam. The flag 70 is released from such bar 54 as the latter starts to move outwardly and when released drops in the path of the light beam. The flag 70 remains in the path of the light beam, so that the machine will continue to operate after the doughs have ceased to break the light beam. As the light beam is re-established to the photo-electric cell it throws out the magnetic switch 26, de-energizing the solenoids 27 and 28 and at this time the trays 22 and pans 31 are in a position to receive a pair of batches of dough which would start the second cycle of the machine. As the arm 44 reaches the end of its inward stroke, the latches 68 contact with the abutments 68a and which permit of the pins 52 to move in the slots 53 sufficient distance to press the ball cranks 49 in a direction, and to an extent to open the covers 50 whereby the trays 22 will be in dough receiving position. The twisting means, including the assembly 46, bars 54 and helically grooved shaft 47 comes to rest as it reaches stop 72. At the end of 360° travel of the disc 37, the pin 39 drops into the notch 37a locking the entire twisting means on its dead center. As the solenoid 27 is de-energized, the arm 38 and the lifter 40 drops into position under the latching member 38a, the brake band is released thereby permitting movement of the outer drum of the planetary clutch 33 so that driving movement of its disc from the shaft 27a is not had.

Arranged below the platform B is an arm 73 carried by a shaft 74. The latter also carries an arm 75 disposed in angular relation to and of less length than the arm 73. The shaft 74 is suspended from platform B. The arm 73 extends into the path of rod 43. Pivotally suspended from the platform B is a spring controlled pawl 76 disposed in the path of arm 75. A ratchet 77 is mounted on the outer band of a planetary clutch 77a on shaft 27a. The disc of the clutch 77a which supports the planet gears indicated at 77b is formed with a hub 77c provided with a sprocket wheel 77d. A conveyor shaft is indicated at 78 and is provided with a sprocket 78a operated by an endless chain 78b driven from the sprocket wheel 77a. Associated with the pawl 76, is a spring controlled pivotally suspended latch 79 connected to the lower end of a hanger 79a. A horizontally disposed endless pan conveyor 79b driven from the shaft 78 travels above and below the platform B. The conveyor 79b is provided with spaced lugs 79c. The shaft 78 carries a sprocket 79d for operating the conveyor. A depressible stop arm is indicated at 80 and it is formed with an upstanding outer terminal portion 81, extending through platform B to above the conveyor. The arm 80 is fixed at its inner end to an oscillatory shaft 82 below and suspended from platform B. Attached to the other end of shaft 82 is an arm 82a extending in an opposite direction with respect to arm 80. Suitably connected, as at 82b to the outer end of arm 82a is a spring controlled latch 83 for correlation with the latch 79. The latch 83 carries an abutment 83a which correlates with a lug 83b on the fixed end of arm 75.

A series of pans are shown for receiving the twisted dough, one of these pans has been referred to and designated 67a. The other pans are indicated at 67b, 67c, 67d. The said series of pans are arranged over the conveyor 79b and are slidably mounted on the track members 83c. Each of the pans of the series is arranged between a pair of lugs 79c and at times bears upon the portion 81 of arm 80 to depress such portion and rock shaft 82 in a direction to elevate arm 82a.

As heretofore stated the twisted doughs are dropped into the pan 67a when the disc 37 has moved 180°. After the disc 37 has traveled from 15 to 20° beyond the dumping position of the machine for the twisted doughs, the rod 43 which is on an upward movement, meets the arm 73 which oscillates shaft 74 and turns arm 75 in a direction to press the pawl 76 into ratchet 77, thus causing the sprocket wheel 77d to revolve. This drives the conveyor shaft 78, which starts the pan 67a, into which the twisted doughs have been deposited, in motion and it moves off the machine in the direction of the arrow, Figure 2. When pawl 76 is forced into the ratchet 77, the latch 79 drops behind the pawl and holds it in the ratchet 77. After the pan 67a has advanced sufficient distance, it clears the portion 81 of arm 80 and allows of the said portion to move upwardly between pans 67a, 67b whereby shaft 82 is rocked in a direction to lower arm 82a, dropping the latch 83 under the latch 79. As pan 67b advances it depresses the portion 81 of arm 80 whereby shaft 82 is rocked in a direction to elevate arm 82a, which pulls up latch 83 and permits pawl 76 to release ratchet 77. The pawl 76 is pulled away from ratchet 77 and against arm 75 by spring 84, thus permitting the outer band of the planetary clutch to revolve and stopping motion of the pan conveyor, at a time when pan 67b is in a position to receive the doughs twisted in the next cycle of the twisting means.

As to the planetary clutches, the shaft 27a is in constant motion and to which is keyed the gear 86 of the clutch. The planet gears 87 revolve the outer band or casing of the clutch when the journals 88 of the gears 87 are held rigid by the disc on which they are mounted rigidly. When the outer band or casing is made stationary by the brake band or the ratchet 77 and pawl 76, then the planet gears revolve forcing the disc to revolve. When the outer casing or band is permitted to revolve freely again, the revolving of the disc and the hub which is attached is discontinued.

The general drive for the machine is from a motor 92 running constantly and driving a worm and gear speed reducer 93 which operates the shaft 27a. The latter drives all of the mechanisms of the machine and is termed an operating shaft. The drive sprocket U of the shaft T of conveyor N is driven from the endless chain V operated from a sprocket 95 carried by shaft 27a.

What I claim is:

1. In a dough twisting machine, a combined clamping, sustaining and dumping device for corresponding end terminal portions of a pair of batches of dough supplied thereto, an inwardly and outwardly horizontally shiftable structure aligned with said device and including a part for supporting and moving off of the batches of dough, on the outward shift of said structure while the batches are clamped by said device, and said structure including means for revolving said part to provide for the twisting of the batches of dough together during the outward shift of said structure.

2. In a dough twisting machine, a combined clamping, sustaining and dumping device for corresponding end terminal portions of a pair of batches of dough supplied thereto, an inwardly and outwardly horizontally shiftable structure aligned with said device and including a part for supporting and moving off of the batches of dough, on the outward shift of said structure while the batches are clamped by said device, and said structure including means for revolving said part to provide for the twisting of the batches of dough together during the outward shift of said structure, oppositely movable, normally inactive, pivotally suspended, releasable, spring controlled holder elements supporting, when in active position, the twisted together portions of the batches of dough as said part moves off of said batches, and said structure including shiftable releasers to provide for said elements moving to active position on the start of the outward movement of the structure.

3. In a dough twisting machine, a combined clamping, sustaining and dumping device for corresponding end terminal portions of a pair of batches of dough supplied thereto, an inwardly and outwardly horizontally shiftable structure aligned with said device and including a part for supporting and moving off of the batches of dough, on the outward shift of said structure while the batches are clamped by said device, said structure including means for revolving said part to provide for the twisting of the batches of dough together during the outward shift of said structure, said device including oppositely movable pivotally suspended normally inactive releasable spring controlled holder members for releasably maintaining, when in active position said device in dough batch sustaining position, and said structure including shiftable releasers to provide for said members moving to active position on the start of the outward movement of said structure.

4. In a dough twisting machine, a combined clamping, sustaining and dumping device for corresponding end terminal portions of a pair of batches of dough supplied thereto, an inwardly and outwardly horizontally shiftable structure aligned with said device and including a part for supporting and moving off of the batches of dough, on the outward shift of said structure while the batches are clamped by said device, said structure including means for revolving said part to provide for the twisting of the batches of dough together during the outward shift of said structure, oppositely movable, normally inactive, pivotally suspended, releasable, spring controlled holder elements supporting, when in active position, the twisted together portions of the batches of dough as said part moves off of said batches, said structure including shiftable releasers to provide for said elements moving to active position on the start of the outward movement of the structure, said device including oppositely movable pivotally suspended normally inactive releasable spring controlled holder members for releasably maintaining, when in active position, said device in dough batch sustaining position, and said structure including shiftable releasers to provide for said members moving to active position on the start of the outward movement of said structure.

5. In a dough twisting machine, a combined clamping, sustaining and dumping device for corresponding and terminal portions of a pair of batches of dough supplied thereto, an inwardly and outwardly horizontally shiftable structure aligned with said device and including a part for supporting and moving off of the batches of dough, on the outward shift of said structure while the batches of dough are clamped together during the outward shift of said structure, oppositely movable, normally inactive, pivotally suspended, releasable, spring controlled holder elements supporting, when in active position, the twisted together portions of the batches of dough as said part moves off of said batches, said structure including shiftable releasers to provide for said elements moving to active position on the start of the outward movement of the structure, said device including oppositely movable pivotally suspended normally inactive releasable spring controlled holder members for releasably maintaining, when in active position, said device in dough batch sustaining position, said structure including shiftable releasers to provide for said members moving to active position on the start of the outward movement of said structure, and said structure including parts correlated with the releasers for said members for shifting said members and elements to inactive position at the end of the outward movement of said structure.

6. In a dough twisting machine, a combined clamping, sustaining and dumping device for corresponding end terminal portions of a pair of batches of dough supplied thereto, an inwardly and outwardly horizontally shiftable structure aligned with said device and including a part for supporting and moving off of the batches of dough, on the outward shift of said structure while the batches are clamped by said device, said structure including means for revolving said part to provide for the twisting of the batches of dough together during the outward shift of said structure, a hopper including a pair of open top chambers and a counterbalanced closure means common to the lower ends of the chambers, said hopper being arranged above said part and said device, a dough conveyor structure for alternately discharging a batch of dough into said chambers, the combined weight of the batches of dough being such to overbalance said closure to open the hopper for the passage of the batches to said part and said device, means operated by the batches of dough being conveyed for alternately opening and closing the upper ends of said chambers, a normally latched driving means for said structures, normally inactive electrical operated means for said structures, normally inactive electrical operated means for releasing said driving means, means for directing a light beam over said part and device to and for maintaining said electrically operated means inactive and with the beam intercepted by the batches of dough on their passage to said part and device whereby said electrical means becomes active, a light beam intercepter controlled from said shiftable structure, a driven operating shaft for said driving means, and said driving means including clutching structures for connecting the driving means to said shaft when said electrical means is active.

7. In a dough twisting machine, a combined clamping, sustaining and dumping device for corresponding end terminal portions of a pair of batches of dough supplied thereto, an inwardly and outwardly horizontally shiftable structure aligned with said device and including a part for supporting and moving off of the batches of dough, on the outward shift of said structure while the batches are clamped by said device, said structure including means for revolving said part to provide for the twisting of the batches of dough together during the outward shift of said structure, means for supplying the pair of batches of dough to said part and device, normally inactive electrical operated means for controlling the operation of said structure and device, means for directing a light beam over said part and device to said electrical operated means to make the latter inactive and with the beam intercepted by the doughs on their passage to said part and device whereby said electrical operated means becomes active, and an adjustable light beam intercepter controlled by said shiftable structure.

8. In a dough twisting machine, a combined clamping, sustaining and dumping device for corresponding end terminal portions of a pair of batches of dough supplied thereto, an inwardly and outwardly horizontally shiftable structure aligned with said device and including a part for supporting and moving off of the batches of dough, on the outward shift of said structure including means for revolving said part to provide for the twisting of the batches of dough together during the outward shift of said structure, means for supplying the pair of batches of dough to said part and device, normally inactive electrical operated means for controlling the operation of said structure and device, means for directing a light beam over said part and device to said electrical operated means to make the latter inactive and with the beam intercepted by the doughs on their passage to said part and device whereby said electrical operated means becomes active, an adjustable light beam intercepter controlled by said shiftable structure, oppositely movable, normally inactive, pivotally suspended, releasable, spring controlled holder elements supporting, when in active position, the twisted together portions of the batches of dough as said part moves off of said batches, and said structure including shiftable releasers to provide for said elements moving to active position on the start of the outward movement of the structure.

9. In a dough twisting machine, a combined clamping, sustaining and dumping device for corresponding end terminal portions of a pair of batches of dough supplied thereto, an inwardly and outwardly horizontally shiftable structure aligned with said device and including a part for supporting and moving off of the batches of dough, on the outward shift of said structure while the batches are clamped by said device, said structure including means for revolving said part to provide for the twisting of the batches of dough together during the outward shift of said structure, means for supplying the pair of batches of dough to said part and device, normally inactive electrical operated means for controlling the operation of said structure and device, means for directing a light beam over said part and device to said electrical operated means to make the latter inactive and with the beam intercepted by the doughs on their passage to said part and device whereby said electrical operated means becomes active, an adjustable light beam intercepter controlled by said shiftable structure, said device including oppositely movable, pivotally suspended, normally inactive, releasable, spring controlled holder members for releasably maintaining, when in active position said device in dough batch sustaining position, and said structure including shiftable releasers to provide for said members moving to active position on the start of the outward movement of said structure.

10. In a dough twisting machine, a combined clamping, sustaining and dumping device for corresponding end terminal portions of a pair of batches of dough supplied thereto, an inwardly and outwardly horizontally shiftable structure aligned with said device and including a part for supporting and moving off of the batches of dough, on the outward shift of said structure while the batches are clamped by said device, said structure including means for revolving said part to provide for the twisting of the batches of dough together during the outward shift of said structure, means for supplying the pair of batches of dough to said part and device, normally inactive electrical operated means for controlling the operation of said structure and device, means for directing a light beam over said part and device to said electrical operated means to make the latter inactive and with the beam intercepted by the doughs on their passage to said part and device whereby said electrical operated means becomes active, an adjustable light beam intercepter controlled by said shiftable structure, oppositely movable, normally inactive, pivotally suspended, releasable, spring controlled holder elements supporting, when in active position the twisted together portions of the batches of dough as said part moves off of said batches, and said structure including shiftable releasers to provide for said elements moving to active position on the start of the outward movement of the structure, said device including oppositely movable, pivotally suspended, normally inactive releasable spring controlled holder members for releasably maintaining, when in active position said device in dough batch sustaining position, said structure including shiftable releasers to provide for said members moving to active position on the start of the outward movement of said structure, and said structure including parts correlated with the releasers for said members for shifting said members and elements to inactive position at the end of the outward movement of said structure.

11. In a dough twisting machine, a combined clamping, sustaining and dumping device for corresponding end terminal portions of a pair of batches of dough supplied thereto, an inwardly and outwardly horizontally shiftable structure aligned with said device and including a part for supporting and moving off of the batches of dough, on the outward shift of said structure while the batches are clamped by said device, said structure including means for revolving said part to provide for the twisting of the batches of dough together during the outward shift of said structure, and means controlled from said structure for supporting the twisted together portions of the doughs as said part moves off of the doughs.

12. In a dough twisting machine, a combined clamping, sustaining and dumping device for corresponding end terminal portions of a pair of batches of dough supplied thereto, an inwardly and outwardly horizontally shiftable structure aligned with said device and including a part for supporting and moving off of the batches of dough, on the outward shift of said structure while the batches are clamped by said device, said structure including means for revolving said part to provide for the twisting of the batches of dough together during the outward shift of said structure, means controlled from said structure for supporting the twisted together portions of the doughs as said part moves off of the doughs, and said structure including means acting on said device and said supporting means for respectively releasing the end terminal portions of the twisted doughs and to remove said supporting means from supporting position at the extent of the outward shift of said structure.

13. In a dough twisting machine, a combined clamping, sustaining and dumping device for corresponding end terminal portions of a pair of batches of dough supplied thereto, an inwardly and outwardly horizontally shiftable structure aligned with said device and including a part for supporting and moving off of the batches of dough, on the outward shift of said structure while the batches are clamped by said device, said structure including means for revolving said part to provide for the twisting of the batches of dough together during the outward shift of said structure, means controlled from said structure for supporting the twisted together portions of the doughs as said part moves off of the doughs, a normally latched operating means for said structure and device, and a light beam control electrically operated releasing means for said operating means.

14. In a dough twisting machine a combined clamping, sustaining and dumping device for corresponding end terminal portions of a pair of batches of dough supplied thereto, an inwardly and outwardly horizontally shiftable structure aligned with said device and including a part for supporting and moving off of the batches of dough, on the outward shift of said structure while the batches are clamped by said device, said structure including means for revolving said part to provide for the twisting of the batches of dough together during the outward shift of said structure, means controlled from said structure for supporting the twisted together portions of the doughs as said part moves off of the doughs, said structure including means acting on said device and said supporting means for respectively releasing the end terminal portions of the twisted doughs and to remove said supporting means from supporting position at the extent of the outward shift of said structure, a normally latched operating means for said structure and device, and a light beam control electrically operated releasing means for said operating means.

BERT AUSTIN HOWE.